United States Patent
Chu et al.

(10) Patent No.: US 12,182,160 B2
(45) Date of Patent: Dec. 31, 2024

(54) DATA EXCHANGE AVAILABILITY, LISTING VISIBILITY, AND LISTING FULFILLMENT

(71) Applicant: SNOWFLAKE INC., San Mateo, CA (US)

(72) Inventors: Pui Kei Johnston Chu, San Mateo, CA (US); Benoit Dageville, Foster City, CA (US); Prasanna Krishnan, Palo Alto, CA (US); Elkhan Mammedov, Berlin (DE); Chao Ren, Foster City, CA (US); Bowen Zhang, Newark, CA (US); Rongpeng Zheng, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 16/994,325

(22) Filed: Aug. 14, 2020

(65) Prior Publication Data
US 2022/0050855 A1    Feb. 17, 2022

(51) Int. Cl.
*G06F 16/27* (2019.01)
*G06F 16/23* (2019.01)
(Continued)

(52) U.S. Cl.
CPC .......... *G06F 16/27* (2019.01); *G06F 16/2379* (2019.01); *G06Q 30/0201* (2013.01); *H04L 67/10* (2013.01)

(58) Field of Classification Search
None
See application file for complete search history.

(56) References Cited

U.S. PATENT DOCUMENTS

| 6,625,705 B2 * | 9/2003 | Yanai | G06F 11/2082 714/E11.107 |
| 6,640,238 B1 * | 10/2003 | Bowman-Amuah | H04L 67/568 709/224 |

(Continued)

FOREIGN PATENT DOCUMENTS

WO    2016077483 A1    5/2016

OTHER PUBLICATIONS

Extended European Search Report from related EP Application No. 21856435.9, mailed on Nov. 11, 2023 (12 pages).
(Continued)

*Primary Examiner* — Kris E Mackes
*Assistant Examiner* — Cao D Vuong
(74) *Attorney, Agent, or Firm* — Womble Bond Dickinson (US) LLP

(57) ABSTRACT

Provided herein are systems and methods for providing a secure and efficient way to manage a data exchange's availability and manage the visibility of data listings of the data exchange. For example, the method may comprise specifying, by an exchange admin of the data exchange, a set of regions where the data exchange is available, each of the set of regions comprising one or more remote deployments. The method may further comprise specifying by a data provider, one or more of the set of regions where a data listing owned by the data provider is visible. Upon receiving a request to access the data listing from a remote deployment of the one or more regions, the data provider may determine whether to reject or fulfill the request. In response to determining that the request should be fulfilled, replicating data of the data listing to the remote deployment.

24 Claims, 10 Drawing Sheets

(51) Int. Cl.
*G06Q 30/0201* (2023.01)
*H04L 67/10* (2022.01)

(56) References Cited

U.S. PATENT DOCUMENTS

| | | | | |
|---|---|---|---|---|
| 7,805,407 | B1* | 9/2010 | Verbeke | G06F 11/2097 |
| | | | | 707/634 |
| 9,659,080 | B1* | 5/2017 | Drobychev | H04L 67/1095 |
| 10,089,373 | B1* | 10/2018 | Allen | G06F 16/27 |
| 10,365,982 | B1* | 7/2019 | Brooks | G06F 3/0659 |
| 10,521,449 | B1* | 12/2019 | Schwartz | G06F 16/27 |
| 2002/0133597 | A1* | 9/2002 | Jhingan | H04L 67/30 |
| | | | | 709/224 |
| 2007/0143357 | A1* | 6/2007 | Chaudhri | H04L 63/08 |
| 2008/0120129 | A1 | 5/2008 | Seubert et al. | |
| 2013/0262385 | A1* | 10/2013 | Kumarasamy | G06F 16/27 |
| | | | | 707/634 |
| 2019/0012105 | A1* | 1/2019 | Schreter | G06F 11/1471 |
| 2019/0294582 | A1* | 9/2019 | Zhu | G06F 3/065 |
| 2019/0303386 | A1* | 10/2019 | Halligan | H04W 8/00 |
| 2019/0377886 | A1* | 12/2019 | Roy | H04L 9/0861 |
| 2019/0391957 | A1* | 12/2019 | Ye | G06F 16/113 |
| 2020/0042619 | A1* | 2/2020 | Venkataramani | G06F 16/1844 |

OTHER PUBLICATIONS

India Examination Report from related IN Application No. 202347005214, mailed on Oct. 3, 2023 (8 pages).
PCT International Search Report and Written Opinion from related PCT Application No. PCT/US2021/043864, mailed on Aug. 25, 2021 (10 pages).

* cited by examiner

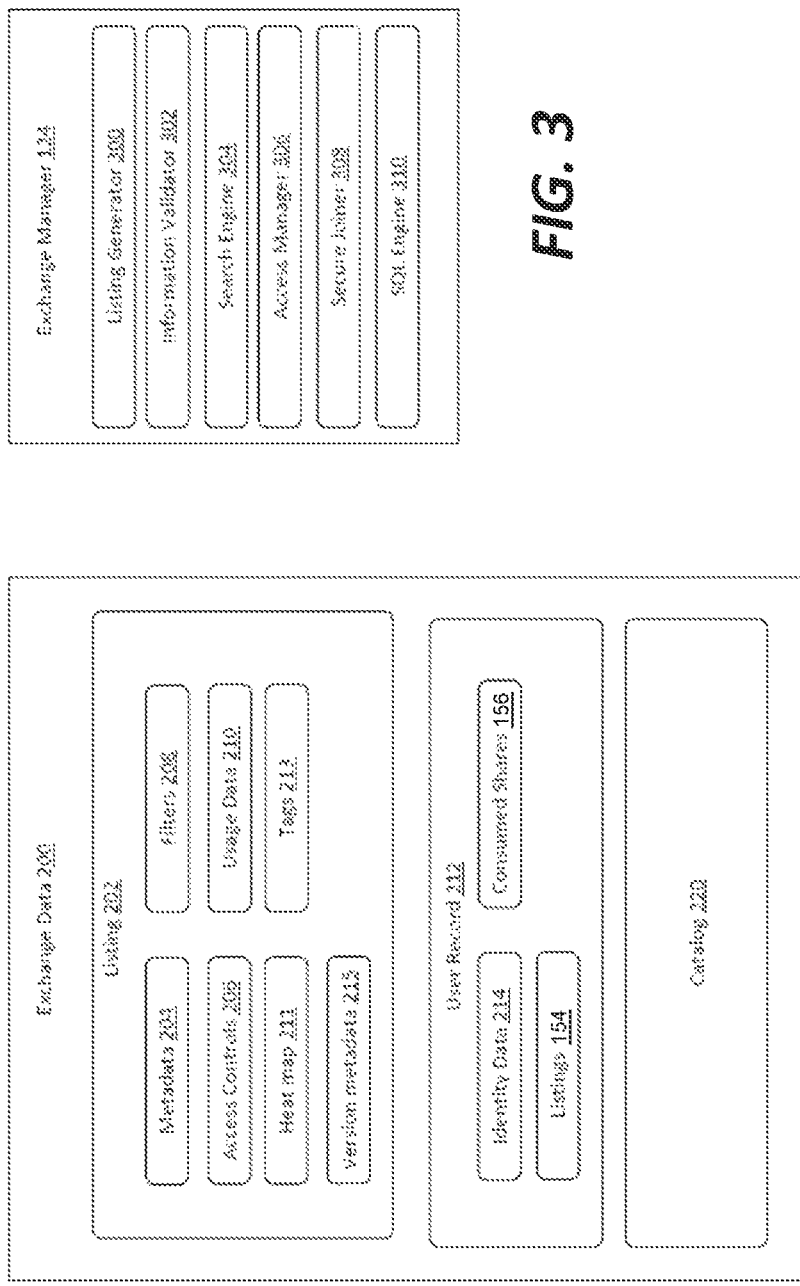

DATA EXCHANGE AVAILABILITY, LISTING VISIBILITY, AND LISTING FULFILLMENT

TECHNICAL FIELD

The present disclosure relates to data sharing platforms, and particularly to availability of a data sharing platform among remote deployments and visibility/fulfillment of listings among remote deployments.

BACKGROUND

Data sharing platforms, including databases, are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a schematic block diagram of data that may be used to implement a public or private data exchange in accordance with an embodiment of the present invention.

FIG. 3 is a schematic block diagram of components for implementing a data exchange in accordance with an embodiment of the present invention.

DETAILED DESCRIPTION

Figure 1A:
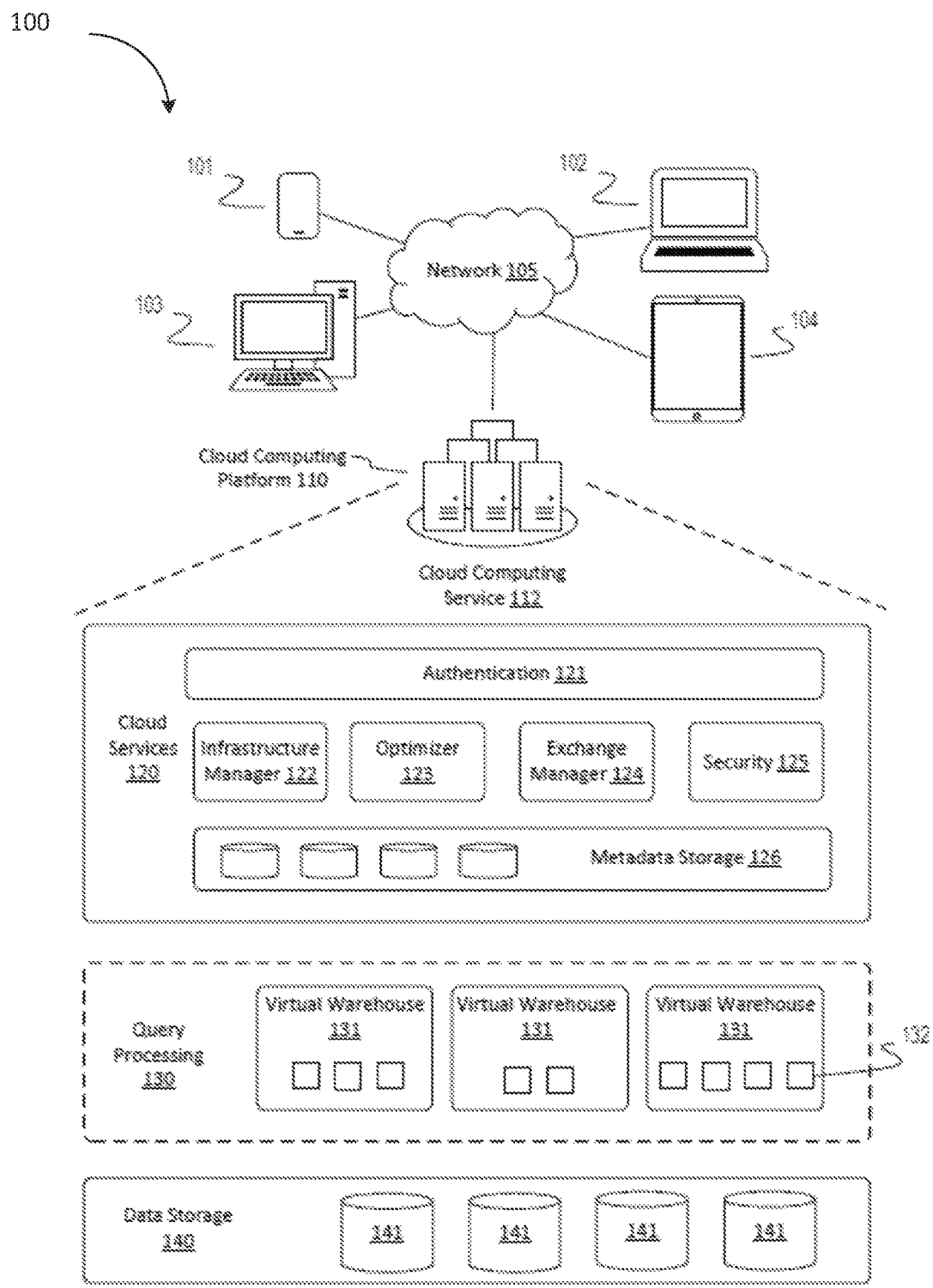
FIG. 1A is a block diagram depicting an example computing environment in which the methods disclosed herein may be implemented.

Data providers often have data assets that are cumbersome to share. A data asset may be data that is of interest to another entity. For example, a large online retail company may have a data set that includes the purchasing habits of millions of customers over the last ten years. This data set may be large. If the online retailer wishes to share all or a portion of this data with another entity (anonymized and/or aggregated, in accordance with applicable privacy laws and contractual obligations), the online retailer may need to use old and slow methods to transfer the data, such as a file-transfer-protocol (FTP), or even copying the data onto physical media and mailing the physical media to the other entity. This has several disadvantages. First, it is slow. Copying terabytes or petabytes of data can take days. Second, once the data is delivered, the sharer cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., small and medium-sized businesses (SMBs), "mom and pop" shops, etc.) or even smaller, more nimble cloud-focused startups are often priced out of accessing this data, even though the data may be valuable to their businesses. This may be because raw data assets are generally too unpolished and full of potentially sensitive data to just outright sell to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of customers. A private data exchange (also referred to herein as a "data exchange") may be under the data provider's brand, and the data provider may control who can gain access to it. The data exchange may be for internal use only, or may also be opened to customers, partners, suppliers, or others. The data provider may control what data assets are listed as well as control who has access to which sets of data. This allows for a seamless way to discover and share data both within a data provider's organization and with its business partners.

A data exchange may be facilitated by a cloud computing service such as SNOWFLAKE☐, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A may be a consumer data company that has collected and analyzed the consumption habits of millions of individuals in several different categories. Their data sets may include data in the following categories: online shopping, video streaming, electricity consumption, automobile usage, interne usage, clothing purchases, mobile application purchases, club memberships, and online subscription services. Company A may desire to offer these data sets (or subsets or derived products of these data sets) to other entities. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "Snowflake data marketplace," or a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud computing services of a cloud computing service provider such as SNOWFLAKE□.

Data that is shared by a provider (also referred to as a "data provider") may be described by listings defined by the provider in a data exchange or in a data marketplace. The access controls, management, and governance of the listings may be similar for both a data marketplace and a data exchange. A listing may include metadata describing the shared data.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share).

In a public or private data exchange, many requests for a listing may originate from a remote deployment in a different region from the local deployment where the provider is based. Although cross region functionality in a data exchange can be implemented, in some scenarios a data exchange owner/administrator may want to restrict where (e.g., which regions or remote deployments) the data exchange is available. In addition, a provider may wish to control where their data listings are visible. For example, companies and governments may have disparate and varying requirements/regulations on where certain data can be available. Data providers themselves may have their own requirements/restrictions as to who can see/access their data and where their data can be seen/accessed from. Although controls regarding listing visibility may be implemented in a single instance of a data exchange, implementing such controls in a cross-region data exchange, over multiple remote deployments that do not share the same storage is not feasible. In addition, even if a listing is visible across multiple remote deployments, because the underlying data still resides in the local deployment, a means for requesting and fulfilling the data is required.

The systems and methods described herein provide a secure and efficient way to manage a data exchange's availability and manage the visibility of data listings of the data exchange. For example, the method may comprise specifying, by an exchange admin of the data exchange, a set of regions where the data exchange is available, each of the set of regions comprising one or more remote deployments. The method may further comprise specifying by a data provider, one or more of the set of regions where a data listing owned by the data provider is visible. Upon receiving a request to access the data listing from a remote deployment of the one or more regions, the data provider may determine whether to reject or fulfill the request. In response to determining that the request should be fulfilled, replicating, by a processing device, data of the data listing to the remote deployment.

FIG. 1A is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security 125 engine, and metadata storage 126.

Figure 1B:
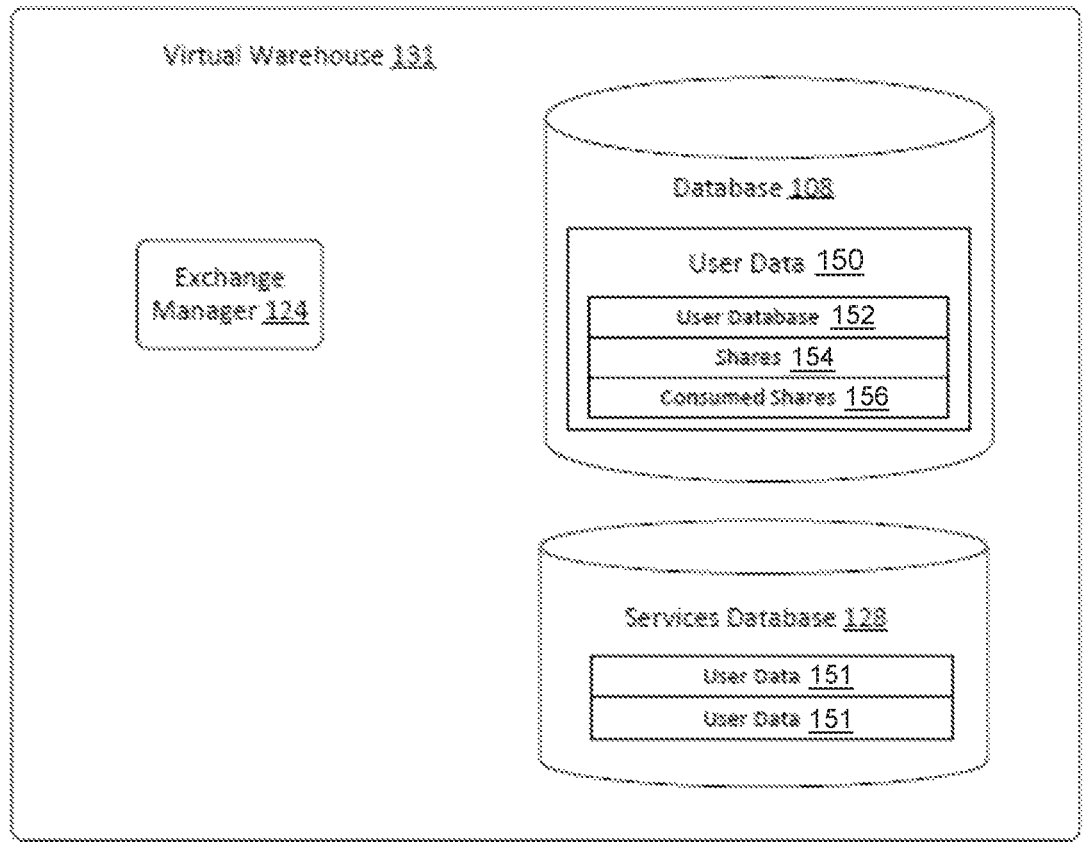
FIG. 1B is a block diagram illustrating an example virtual warehouse.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g. different enterprises or individuals. The user data may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner according to the methods disclosed herein. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104.

In addition, database operations (joining, aggregating, analysis, etc.) ascribed to a user (consumer or provider) shall be understood to include performing of such actions by the cloud computing service 112 in response to an instruction from that user.

FIG. 2 is a schematic block diagram of data that may be used to implement a public or data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

A listing 202 may include metadata 204 describing the shared data. The metadata 204 may include some or all of the following information: an identifier of the sharer of the shared data, a URL associated with the sharer, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share (see discussion of FIG. 4) in which users may request access but are only allowed access upon approval of the provider. The access controls 206 may specify a set of user identifiers of users that are excluded from being able to access the data referenced by the listing 202.

Figure 6:
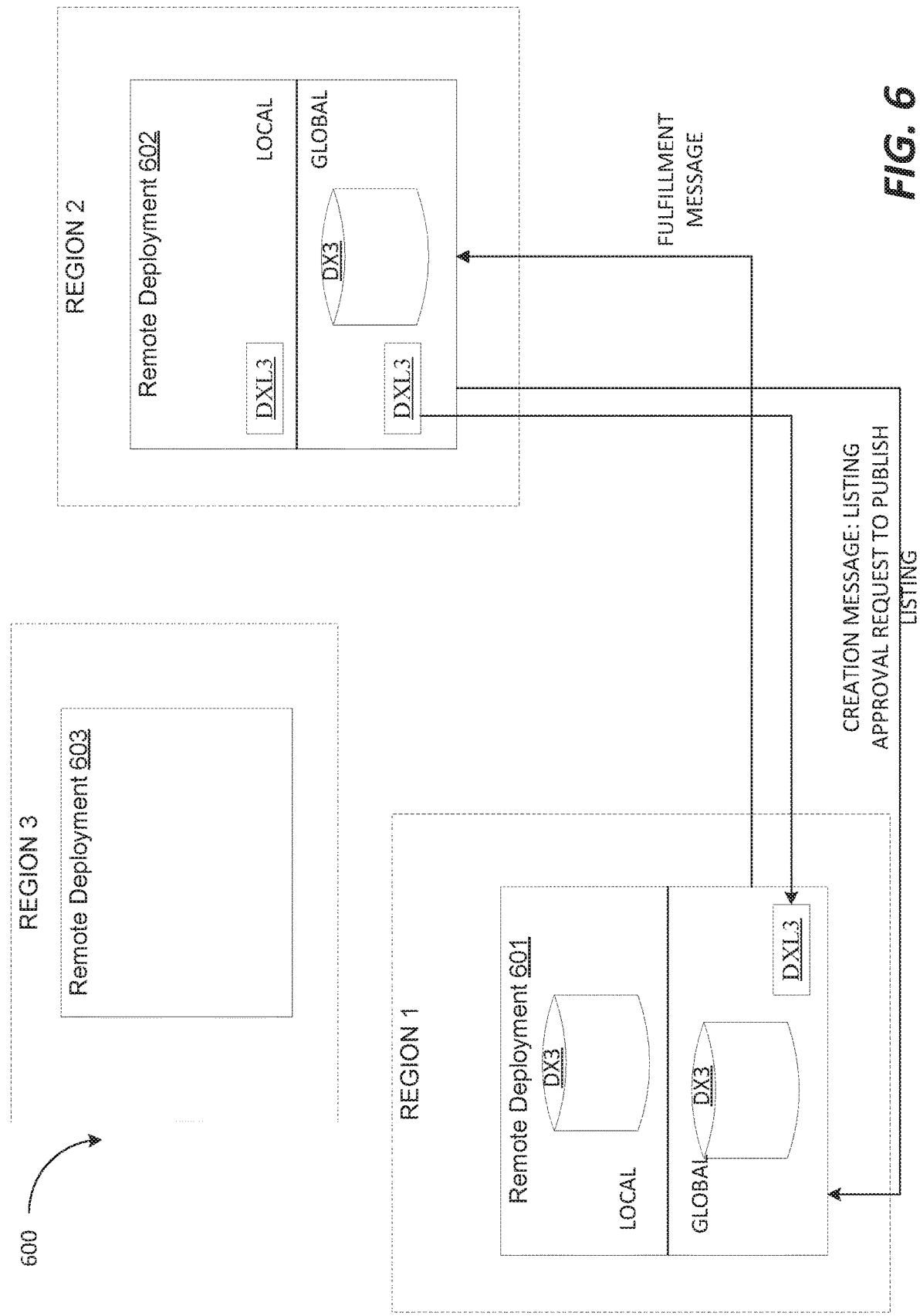
FIGS. 6 is a block diagram of remote deployments in a data exchange, in accordance with some embodiments of the present invention.

Note that some listings 202 may be discoverable by users without further authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 156 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 156 of the user is permitted to access the data referenced by the listing but only a filtered version that only includes data associated with the identity data 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 151 in service database 128 and managed by the virtual warehouse 131.

The user record 212 may list shares associated with the user, e.g., reference listings 154 created by the user. The user record 212 may list shares consumed by the user, e.g. reference listings 202 created by another user and that have been associated to the account of the user according to the methods described herein. For example, a listing 202 may have an identifier that will be used to reference it in the shares or consumed shares of a user record 212.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there a multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only on specified one or more computing platforms 110.

In some embodiments, the catalog 220 is made available on the Internet such that it is searchable by a search engine such as BING or GOOGLE. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

FIG. 3 illustrates various components 300-310 that may be included in the exchange manager 124. A creation module 300 may provide an interface for creating listings 202. For example, a webpage interface to the virtual warehouse 131 that enables a user on a device 101-104 to select data, e.g. a specific table in user data 150 of the user, for sharing and enter values defining some or all of the metadata 204, access controls 206, and filters 208. In some embodiments, creation may be performed by a user by way of SQL commands in an SQL interpreter executing on the cloud computing platform 110 and accessed by way of a webpage interface on a user device 101-104.

A validation module 302 may validate information provided by a provider when attempting to create a listing 202. Note that in some embodiments the actions ascribed to the validation module 302 may be performed by a human reviewing the information provided by the provider. In other embodiments, these actions are performed automatically. The validation module 302 may perform, or facilitate performing by a human operator of various functions. These functions may include verifying that the metadata 204 is consistent with the shared data to which it references, verifying that the shared data referenced by metadata 204 is not pirated data, personal identification information (PII), personal health information (PHI) or other data from which sharing is undesirable or illegal. The validation module 302 may also facilitate the verification that the data has been updated within a threshold period of time (e.g., within the last twenty-four hours). The validation module 302 may also facilitate verifying that the data is not static or not available from other static public sources. The validation module 302 may also facilitate verifying that the data is more than merely a sample (e.g., that the data is sufficiently complete to be useful). For example, geographically limited data may be undesirable whereas an aggregation of data that is not otherwise limited may still be of use.

The exchange manager 124 may include a search module 304. The search module 304 may implement a webpage interface that is accessible by a user on user devices 101-104 in order to invoke searches for search strings with respect to the metadata in the catalog 220, receive responses to searches, and select references to listings 202 in search results for adding to the consumed shares 156 of the user record 212 of the user performing the search. In some embodiments, searches may be performed by a user by way of SQL commands in an SQL interpreter executing on the cloud computing platform 110 and accessed by way of a webpage interface on user devices 101-104. For example, searching for shares may be performed by way of SQL queries against the catalog 220 within the SQL engine 310 discussed below.

The search module 304 may further implement a recommendation algorithm. For example, the recommendation algorithm could recommend other listing 202 for a user based on other listings in the user's consumed shares 156 or formerly in the user's consumed shares. Recommendations could be based on logical similarity: one source of weather data leads to a recommendation for a second source of weather data. Recommendations could be based on dissimilarity: one listing is for data in one domain (geographic area, technical field, etc.) results in a listing for a different domain to facilitate complete coverage by the user's analysis (different geographic area, related technical field, etc.).

The exchange manager 124 may include an access management module 306. As described above, a user may add a listing 202. This may require authentication with respect to the provider of the listing 202. Once a listing 202 is added to the consumed shares 156 of the user record 212 of a user, the user may be either (a) required to authenticate each time the data referenced by the listing 202 is accessed or (b) be automatically authenticated and allowed to access the data once the listing 202 is added. The access management module 306 may manage automatic authentication for subsequent access of data in the consumed shares 156 of a user in order to provide seamless access of the shared data as if it was part of the user data 150 of that user. To that end, the access management module 306 may access controls 206 of the listing 202, certificates, tokens, or other authentication material in order to authenticate the user when performing accesses to shared data.

The exchange manager 124 may include a joining module 308. The joining module 308 manages the integration of shared data referenced by consumed shares 156 of a user with one another, i.e. shared data from different providers, and with a user database 152 of data owned by the user. In particular, the joining module 308 may manage the execution of queries and other computation functions with respect to these various sources of data such that their access is transparent to the user. The joining module 308 may further manage the access of data to enforce restrictions on shared data, e.g. such that analysis may be performed and the results of the analysis displayed without exposing the underlying data to the consumer of the data where this restriction is indicated by the access controls 206 of a listing 202.

The exchange manager 124 may further include a standard query language (SQL) engine 310 that is programmed to receive queries from a user and execute the query with respect to data referenced by the query, which may include consumed shares 156 of the user and the user database 152 owned by the user. The SQL engine 310 may perform any query processing functionality known in the art. The SQL engine 310 may additionally or alternatively include any other database management tool or data analysis tool known in the art. The SQL engine 310 may define a webpage interface executing on the cloud computing platform 110 through which SQL queries are input and responses to SQL queries are presented.

Figure 4A:
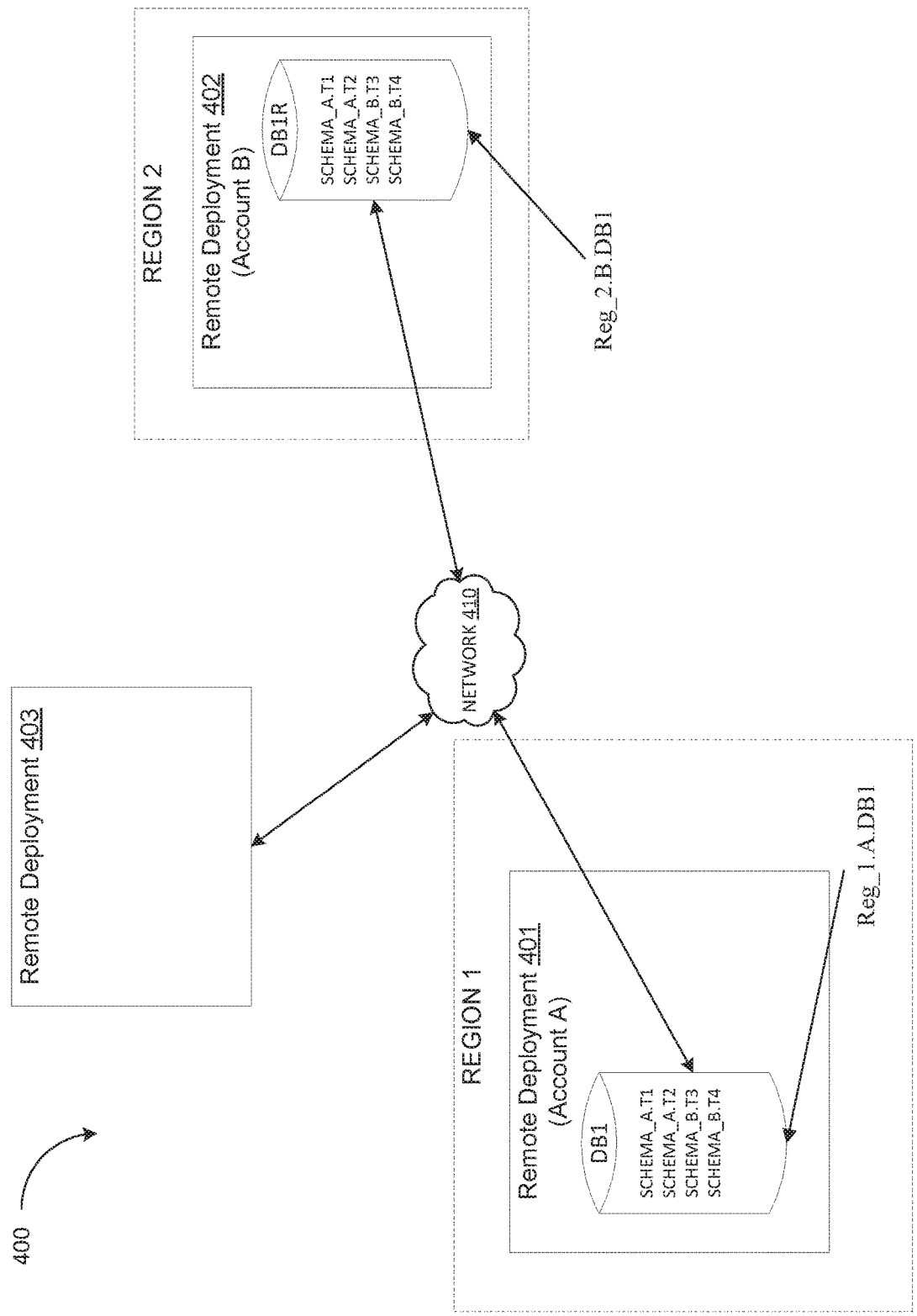
FIG. 4A is a block diagram of remote deployments in a data exchange, in accordance with some embodiments of the present invention.

FIG. 4A illustrates a cloud environment 400 comprising multiple remote cloud deployments 401, 402, and 403. Each of the remote deployments 401, 402, and 403 may comprise a similar architecture to cloud computing service 112 (illustrated in FIG. 1A). The remote deployments 401, 402, and 403 may all be physically located in separate remote geographical regions but may all be deployments of a single data exchange or single data marketplace. In cloud environment 400, requests for data such as data listings, databases, or shares on remote deployment 401 may originate from an account on remote deployment 402 or remote deployment 403. The remote deployment 401 may be the origin deployment of the data exchange or data marketplace and may utilize an appropriate data replication method to make the data of such a request available on remote deployments 402 and 403.

Figure 4B:
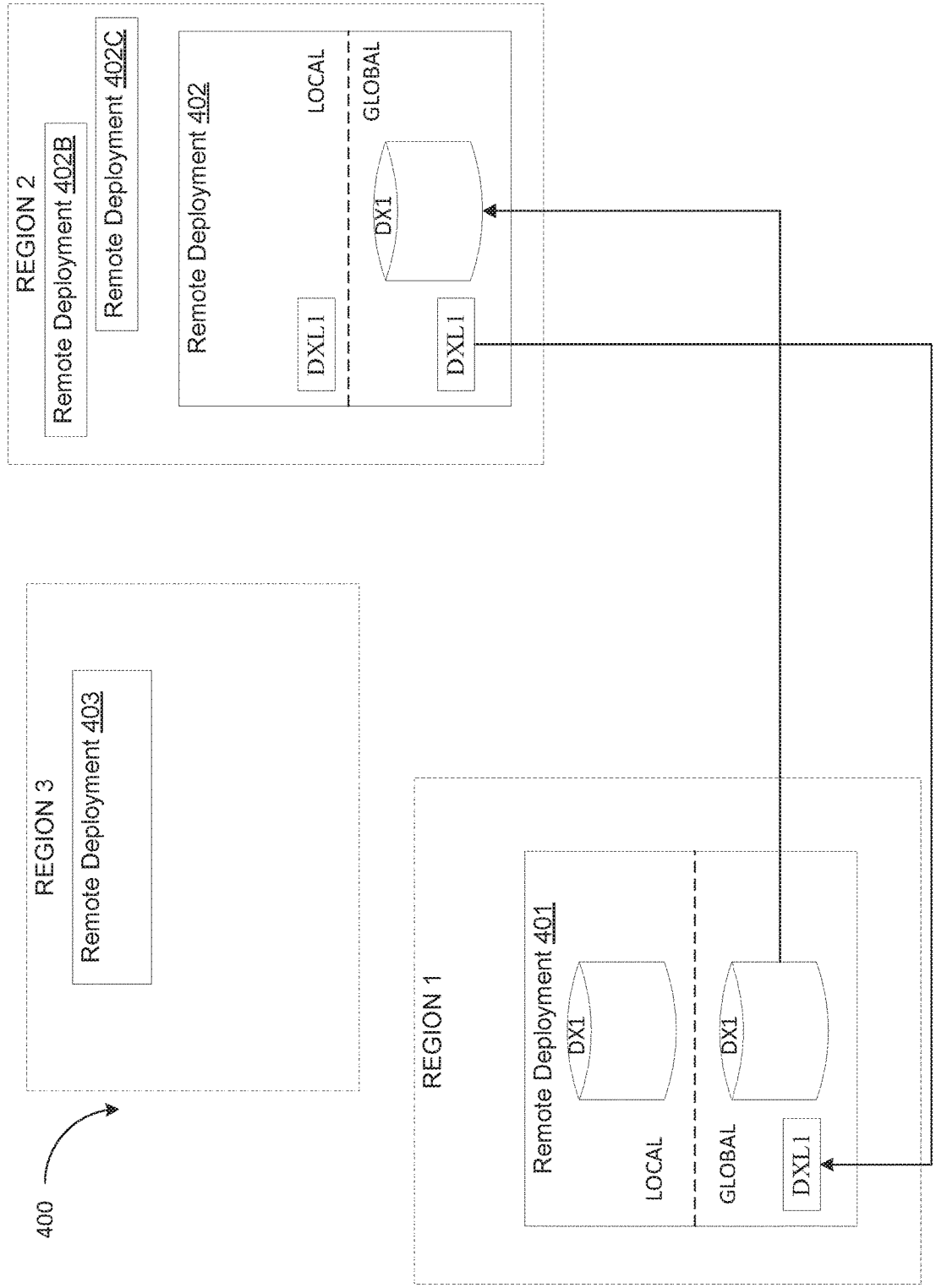
FIG. 4B is a block diagram of remote deployments in a data exchange, in accordance with some embodiments of the present invention.

For example, if account A resides on remote deployment 401 located in region 1 and has a database DB1 on remote deployment 401 that he wants to share with account B residing within remote deployment 402 located in region 2, account A may alter the database DB1 such that it becomes a global type database (as opposed to region specific) and replicate the metadata of DB1 to the remote deployment 402 (e.g., by using an SQL command "alter database DB1 enable replication to accounts Reg_2.B"). Account B may obtain a list of databases for which they have access to (e.g., using an SQL command "show replication databases") which will return the identifier "Reg_1.A.DB1 (primary)" indicating DB1. Account B may create a local replica of DB1 (shown in FIG. 4A as DB1R) on remote deployment 402 (e.g., by using the SQL command "create database DB1R as replica of Reg1.A.DB1"), which creates a global type database, because it was created as a replica. It should be noted that as of now, no data replication has started yet. At this point, the command "show replication databases" will return the identifiers "Reg_1.A.DB1 (primary)" and "Reg_2.B.DB1 (secondary)." Account B may initiate the data replication by using a command (e.g., "alter database DB1 refresh") which is a synchronous operation whose duration may depend on the amount of data to synchronize. As shown in FIG. 4B, each remote deployment includes certain objects locally and those that it accesses a global version of Although discussed in terms of a database, the above method may be used to replicate various types of data objects between remote deployments including data exchanges, data listings, and shares, for example.

In some embodiments, the remote deployments 401-403 may leverage a global messaging framework that utilizes special message types (as discussed in further detail herein) that each specifically enable various different functions. For each global message type, there is a corresponding processing function that applies to processing messages of that type. Thus, a global message of a particular type will include custom logic for what processing needs to be done for that particular message type as discussed in further detail herein.

Although cross region functionality as discussed above can be implemented, in some scenarios a data exchange owner/admin may want to restrict where (e.g., which regions or remote deployments) the data exchange is available. In addition, a data provider may wish to control where their data listings are visible. For example, companies and governments may have disparate and varying requirements/regulations on where certain data can be available. Data providers themselves may have their own requirements/restrictions as to who can see/access their data and where their data can be seen/accessed from, and may also wish to restrict where their listings are visible. Although controls regarding listing visibility may be implemented in a single instance of a data exchange, implementing such controls in a cross-region data exchange, over remote deployments that do not share the same storage is not feasible. In addition, even if a listing is visible across multiple deployments 402 and 403, because the data still resides in the local deployment 401, a means for requesting and fulfilling the data is required.

Embodiments of the present disclosure may utilize the data replication process and global messaging framework described herein to replicate data between remote deployments 401-403 based on customized logic in order to make a data exchange available in specific regions, which could be cross-cloud, and also replicate information regarding the visibility of each data listing in the data exchange to certain regions as well, so that such restrictions may be enforced in each remote deployment, even though the data listing wasn't initially created there. Although discussed in terms of a data exchange, the embodiments of the present disclosure may be implemented in a data marketplace as well. FIG. 4B illustrates the cloud environment 400 in accordance with some embodiments of the present disclosure.

FIG. 4B illustrates remote deployment 401, which may be the origin deployment of the data exchange DX1 along with remote deployments 402 and 403. Remote deployments 402 and 403 are remote deployments where the data exchange DX1 could be made available and, as discussed above, may each reside in their own geographic region (hereinafter "region" and shown in FIG. 4B as regions 1, 2, 3). The data exchange DX1 may have a designated data exchange administrator account (hereinafter "exchange admin") and may provide functionality to allow the exchange admin on remote deployment 401 to specify the regions in which the data exchange DX1 will be available (resolvable) and from which regions customers can be added as members of the data exchange DX1. It should be noted that the exchange admin (like other Snowflake accounts) may include an account administrator role, which may delegate the ability to specify regions in which the data exchange DX1 will be available to other roles in the exchange admin. The data exchange DX1 may also include functionality to allow a data provider to restrict the regions in which visibility for their listing(s) (e.g., listing DXL1 shown in FIG. 4B) is allowed. The remote deployment 401 may provide commands (e.g., SQL commands) for the exchange admin to set the available regions. For example, an exchange admin may use the command "Create data exchange <data_exchange_name>regions=region1, . . . " to create a data exchange that is available in certain regions (e.g., region 1 etc.). When the exchange admin wishes to modify the available regions, they may use the command "Alter data exchange <data_exchange_name>set regions=region1, region2. . . " to modify the regions in which the data exchange is available. The exchange admin may also utilize the command "Alter data exchange <data_exchange_name>unset regions" to remove all currently set available regions, for example. In some embodiments, the exchange admin may modify availability regions, while data exchange account holders, administrators and data providers can view a list of available regions (e.g., using the command "Show regions in data exchange <data_exchange_name>"). For a Snowflake Data Marketplace (SDM), the available regions may automatically be set to those regions where the SDM is currently replicated.

When an exchange admin sets the available regions for the data exchange, this information may be persisted as a list in the local database (not shown) of remote deployment 401. The local database may be any appropriate database, such as e.g., FoundationDB. The local database of remote deployment 401 may include a number of data processing objects (DPOs) in which data pertaining to the data exchange DX1 may be stored. For example, a base dictionary DPO may comprise a set of database tables used to store information about the database's definition including information about database objects such as tables, indexes, columns, datatypes, and views.

One such DPO may be an available regions DPO which extends the base dictionary DPO and in which the available regions of the data exchange DX1 may be persisted. Stated differently, the specified available regions may be a property of the base dictionary DPO. As can be seen in the example commands listed above, the exchange admin may specify the regions in which the data exchange DX1 is available on a region by region basis, instead of specifying particular remote deployments in which DX1 is available on a deployment by deployment basis. Because of this, when the "Alter data exchange" command is executed, instead of persisting deployment identifiers (IDs) of remote deployments on which the data exchange DX1 is to be made available, the remote deployment 401 may persist the deployment location ID of each region where the data exchange is to be made available. A deployment location ID may be represented in any suitable alpha-numeric form such as 1001 or region1 (corresponding to region 1), and 1002 or region2 (corresponding to region 2). The list of available deployment location IDs may be stored as a string (defined as e.g., static final String AVAILABLE_DEPLOYMENT_LOCATION_IDS="availabledeploymentlocationIDs") within the available regions DPO, and the string may be parsed to determine the deployment location IDs of regions where the data exchange DX1 is available when a member of the data exchange DX1 wishes to know the available regions. It should be noted that any of regions 1, 2, and 3 may contain multiple remote deployments and each of these remote deployments may be referred to as a deployment shard. Each deployment shard in a particular region will share the same deployment location ID. Utilizing deployment location IDs is efficient because there is no need to manually refresh a list (string) of available deployment IDs in the available regions DPO every time a new deployment is created. For example, if a new sharding deployment(s) is added to a region, storing deployment IDs would require a manual refresh of the list of available deployment IDs in the relevant DPO. By utilizing/storing deployment location IDs, if e.g., a new deployment/shard is created in any region, the remote deployment 401 only needs to obtain the deployment region of the new deployment/shard, which is easy because it is included in the deployment metadata of the new deployment/shard.

The remote deployment 401 may then replicate the data exchange DX1 to each remote deployment in each of the regions in which the data exchange is to be available (as specified by the exchange admin) using the database replication method discussed hereinabove. For the global object corresponding to the data exchange DX1, remote deployment 401 may decide which remote deployment(s) the global object is to be replicated to by parsing the string of deployment location IDs from the available regions DPO to determine the list of regions where the data exchange DX1 is available. In the example illustrated in FIG. 4B, the exchange admin may set regions 1 (where it currently already exists) and 2 as available regions. When replicating the data exchange DX1, remote deployment 401 needs to know what remote deployments are available in region 2, and may obtain all remote deployments in region 2 (e.g., deployment location ID 1002). In the example of FIG. 4B, this may include remote deployments 402, 402B, and 402C). More specifically, the remote deployment 401 may include a mapping between the deployment location ID of region 2 and the deployment ID of each deployment shard in region 2. Thus, the data exchange DX1 can easily look up all the deployment shard IDs in region 2 (identified by its deployment location ID) and replicate the info to all of the relevant deployment shards. As shown in FIG. 4B, the global object corresponding to the data exchange DX1 is then replicated to remote deployment 402. When a new deployment is created, the list of remote deployments to replicate to may be backfilled by refreshing it. The remote deployment 401 may then continue the data replication method described hereinabove to replicate the data exchange DX1 to each remote deployment in region 2 (i.e. remote deployment 402). The remote deployment 401 may perform this process of obtaining the list of available regions and replicating the data exchange DX1 to the remote deployments in those regions at regular intervals, in some embodiments. As can be seen in FIG. 4B, remote deployment 402 may now access a global copy of data exchange DX1.

Upon the available regions for the data exchange DX1 being set, a data provider of the data exchange DX1 may set the regions in which their listings will be visible (e.g., set listing visibility). A listing may be a consumer viewable representation of data that the data provider wishes to share. The listing may describe what the underlying data is about, contain usage examples regarding the data, and other metadata as discussed herein. The data provider creates the listing, and upon creation, only the data provider can see the listing. Data providers may send listings to the exchange admin for publishing approval (referred to as "listing approval" as described in further detail herein). Once approved, data providers can publish listings to be available globally, in regions where the data exchange DX1 is available.

Listing visibility does not refer to a physical restriction enforced by the existence (or lack thereof) of a listing in remote deployments, which means the listing may be still replicated to those deployments while remaining invisible to consumers there. Once the exchange admin decides which regions the data exchange DX1 is available in, a data provider can choose a subset of those regions in which to make a listing visible.

In the example illustrated in FIG. 4B, a data provider in remote deployment 402 may generate a listing DXL1 (locally in remote deployment 402) to share particular data. The local copy of data exchange DX1 (e.g., previously replicated from remote deployment 401) may provide a set of commands (e.g., SQL commands) for the data provider to set the regions in which listing DXL1 will be visible. For example, the data provider may use the command "Alter listing <listing_name>set regions=region1, region2. . . " to set the regions in which DXL1 will be visible. The data provider may use the command "Alter listing <listing_name>unset regions" to remove all of the previously set regions (so that the listing is not visible in any regions), and may use the command "Show listings in data exchange <dx_name>;" to see the current regions in which DXL1 is visible.

When the data provider sets the regions in which the listing DXL1 is to be visible, this information may be persisted as a list in the local database of the remote deployment 402 (not shown). The local database of remote deployment 402 may be any suitable database such as e.g., FoundationDB and may include a listing visibility regions DPO (not shown) which extends the base dictionary DPO and in which the regions where one or more listings are visible may be persisted. As can be seen in the example commands listed above, the data provider may specify the regions in which their listings are visible on a region by region basis, instead of specifying particular deployments on which their listings are visible on a deployment by deployment basis. Because of this, when the "Alter listing <listing_name>set regions" command is executed, instead of persisting deployment IDs of remote deployments on which the listings are to be made visible, the remote deployment 402 may persist the deployment location ID of each region where the listing DXL1 is to be made visible. The list of deployment location IDs where the listing DXL1 is to be made visible may be stored as a string (defined as e.g., static final String VISIBLE_DEPLOYMENT_LOCATION_IDS="availabledeploymentlocationIDs") in the listing visibility regions DPO, and the string may be parsed to determine the deployment location IDs of regions in which the listing DXL1 is visible when the data provider or the exchange admin wishes to know the regions in which the listing DXL1 is to be visible.

Utilizing deployment location IDs is efficient because there is no need to manually refresh a list of deployment IDs for deployments on which the listings are visible in the listing visibility regions DPO every time a new deployment is created. For example, if a new sharding deployment(s) is added to a region, storing deployment IDs will require a manual refresh of the list of deployment IDs on which the listings are visible. By utilizing/storing deployment location IDs, if a new deployment/shard is created, the data exchange only needs to get the deployment location (region) of the new deployment/shard, which is easy because it is in the deployment metadata of the new deployment/shard.

When the visible regions for the listing DXL1 are set, the remote deployment 402 may replicate the listing DXL1 and the visibility list to each remote deployment in each region where the listing DXL1 is made visible. As discussed above, the remote deployment 402 may obtain the list of regions where the listing DXL1 is visible by parsing the string of deployment location IDs from the listing visibility regions DPO and may package the list of regions along with other information regarding the listing DXL1 such as a type of the listing DXL1 as well as metadata of the listing DXL1 into a single listing information package. The remote deployment 402 may utilize the data replication method described herein, and when the global object corresponding to the listing DXL1 is created, it may include the listing information package. In some embodiments, if the exchange admin is located on a different remote deployment than the data provider (as in the example of FIG. 4B), the exchange admin may obtain the list of regions where the listing DXL1 is visible from the global object corresponding to the listing DXL1 (which includes a copy of the listing information package). Remote deployment 402 may decide which remote deployment(s) the global object is to be replicated to based on the list of regions where the listing DXL1 is visible. Remote deployment 402 may then complete the data replication to replicate the listing DXL1 and the listing information package to each remote deployment in each region where the listing DXL1 is to be visible. The remote deployment 402 may perform this process of obtaining the list of regions where the listing DXL1 is visible and replicating the listing DXL1 and the listing information package to remote deployments in those regions at regular intervals. In the example of FIG. 4B, the data provider has set regions 1 and 2 as regions where the listing DXL1 is visible, and thus DXL1 is replicated to remote deployment 401 as shown.

In some embodiments, the listing DXL1 and the corresponding visibility list may be replicated to each region in which the data exchange DX1 is available, and the listing visibility restrictions may be enforced logically on remote deployments in regions where the listings are not meant to be visible, as specified by the data provider. For example, if the deployment location ID of region 3 is not included in the visibility list, the listing DXL1 and the visibility list may still be replicated to remote deployment 403 (if the data exchange is made available there), but when a consumer on remote deployment 403 wants to resolve the listings available to them, the visibility restrictions set by the data provider may be logically enforced by remote deployment 403 and the consumer on remote deployment 403 may not see the listing DXL1.

When a consumer in a remote deployment 401 in region 1, for example, where the listings are visible (as specified by the data provider) tries to resolve the listings available to them, they may see the listing DXL1 of the data provider and may request to access the data of the listing DXL1. If the listing is pre-approved and the data has already been attached to the listing DXL1, then the data of the listing DXL1 will be replicated immediately/directly along with the listing DXL1 and the listing information package. If the data has not yet been attached to the listing DXL1, the listing DXL1 and the listing information package will still be replicated to remote deployment 401 but the consumer in region 1 will need to request the data.

If a data provider subsequently updates the list of visible regions of listing DXL1 so that the listing is no longer visible in a region in which on which it was previously visible, then consumers on the remote deployments of that region who were members of the data exchange DX1 at the time of listing replication may still be able to resolve the listing, however consumers on the remote deployments of that region who are new members of the data exchange DX1 may not be able to resolve the listing.

Upon replication of the listing DXL1 to each appropriate remote deployment, the data exchange DX1 and listing DXL1 are made global, allowing for requests from consumers in any appropriate remote deployments to make a request to consume the underlying data of the listing DXL1. However, although the listing DXL1 is visible across multiple remote deployments, the underlying data still resides in local remote deployment 401. In order to request the underlying data and fulfill the request, the existing global messaging framework is leveraged to manage consumer requests for listings and to allow data providers to manage listing approval requests.

Figure 5:
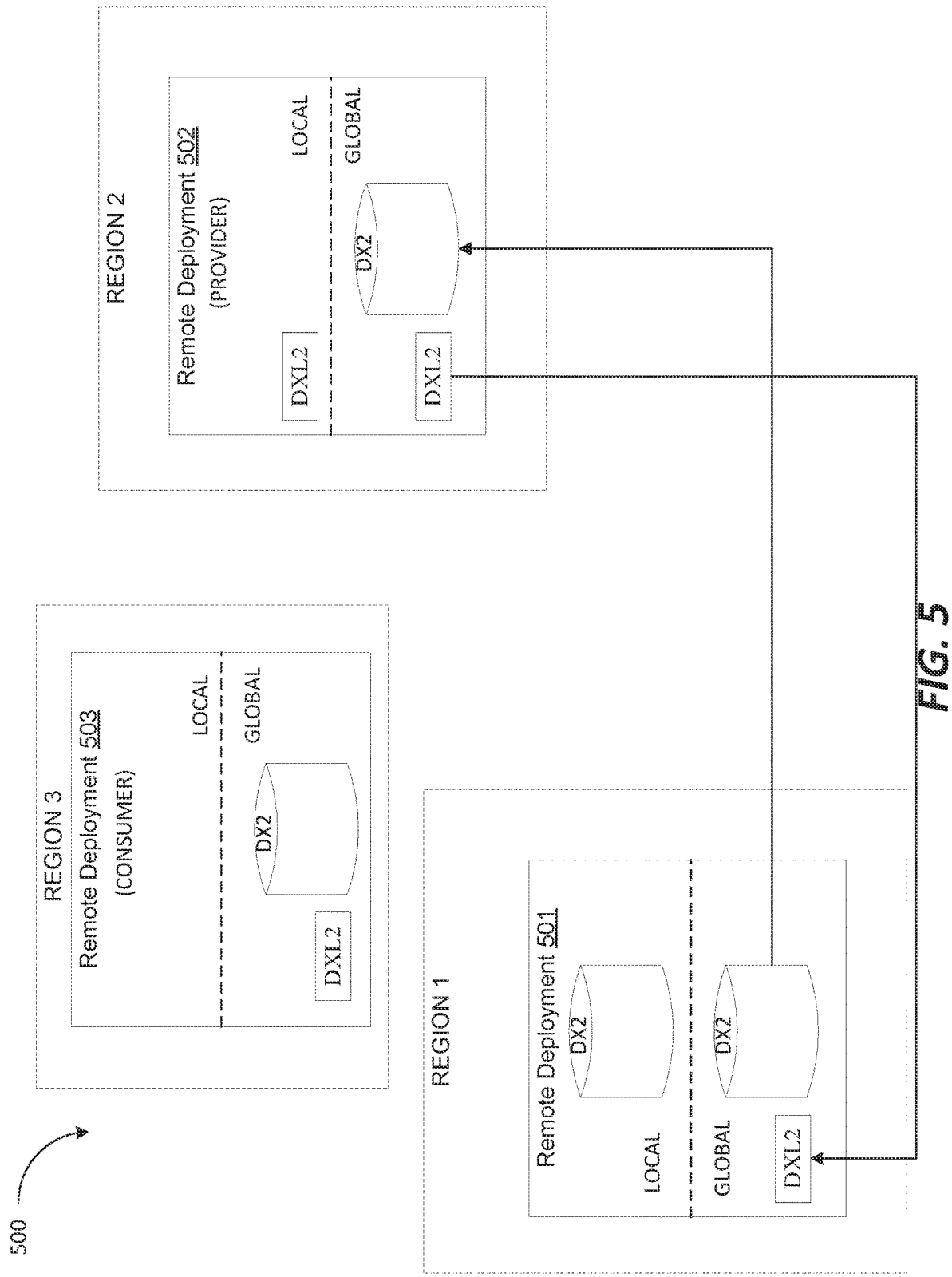
FIG. 5 is a block diagram of remote deployments in a data exchange, in accordance with some embodiments of the present invention.

FIG. 5 illustrates a diagram of a cloud environment 500, which may be similar to the cloud environment 400 illustrated in FIG. 4. In the example of FIG. 5, a consumer on remote deployment 503 where a listing DXL2 is visible wants to request data of the listing DXL2 from the data provider who owns the listing DXL2 on remote deployment 502, which may communicate with the exchange admin on remote deployment 501.

When the consumer in remote deployment 503 wishes to request the listing DXL2, they may utilize the listing metadata (included within the listing information package that is replicated with the global object corresponding to listing DXL2) that indicates who the data provider is and where they are from/their origin remote deployment to determine where to send a request to. The remote deployment 503 may utilize a global message having a global message type "DATA_EXCHANGE_LISTING_REQUEST_SYNC." As discussed above, for each global message type, there is a corresponding processing function that applies to processing messages of that type. Thus, a global message of a particular type will include custom logic for what processing needs to be done for that particular message type. A DATA_EXCHANGE_LISTING_REQUEST_SYNC type of message may be used for managing consumers' requests to providers for listings. This includes creating, cancelling, rejecting, and fulfilling these requests, as well as cleaning requests up (expiring them) when members are removed from the data exchange or a listing is deleted. These messages are sent between the data provider and consumer. The remote deployment 503 may send a creation message (of type: DATA_EXCHANGE_LISTING_REQUEST_SYNC) to the remote deployment 502, which may include a local database having an access request DPO (not shown) that may be used by the data provider to manage approval/denial of requests for data listings. As discussed herein with respect to the global message framework, the creation message may include specialized logic to update the appropriate slice of the access request DPO with the information of the request. Examples of information of the request may include requestor contact information, requestor snowflake account and snowflake region it locates in, as well as why/reason they might be interested in. As used herein, a slice of a multi-dimensional array such as a DPO is a column of data corresponding to a single value for one or more members of a particular dimension.

The data provider in remote deployment 502 may fulfill the request for the listing DXL2 by creating a share associated with the listing and granting access to the share associated with the listing to the consumer. A "ListingRequestFulfiller" background service (BG) may sync listing request fulfillment information and notify/replicate this information to the other regions/deployment shards that might be of interest. More specifically, the "ListingRequestFulfiller" BG may call a fulfillment (global) message (of type: DATA_EXCHANGE_LISTING_REQUEST_SYNC) that will mark the request as fulfilled for the listing provider in the access request DPO, remove it from a "provider_pending" slice of the access request DPO, and write it to the "provider_history" slice of the access request DPO after setting its status to FULFILLED. It should be noted that the share associated with that listing DXL2 can be created (and access to it granted) either by the data provider or a fulfiller which is a data provider in the same remote deployment shard as the consumer (e.g., remote deployment 503) or a data provider located in the same region as the consumer (e.g., region 3). If the access is granted by a fulfiller in the same deployment shard as the consumer, this may trigger a write to a "listingShareUpdatedOn" slice in a share status DPO on the remote deployment 503, used by the consumer to manage their listing data requests. The "listingShareUpdatedOn" slice may be used to indicate data listings that the consumer has been granted access to a share of If the access is granted by a fulfiller that is not in the same deployment shard as the consumer but is on a deployment shard in the same region, a "RemoteShardAccountManager" BG that syncs account and share info between deployment shards in the same region may run in the consumer's remote deployment 503, see the consumer was added to the share, and update the "listingShareUpdatedOn" slice of the share status DPO. The "ListingRequestFulfiller" BG will run in the consumer's remote deployment 503 and mark the request as fulfilled locally in the share status DPO and will send a fulfillment message (of type: DATA_EXCHANGE_LISTING_REQUEST_SYNC) to the provider on remote deployment 502 to update the access request DPO by marking the request as fulfilled, removing it from the "provider_pending" slice and writing it to the "provider_history" slice after setting its status to FULFILLED.

If the provider denies the request, then it may update the access request DPO and send a rejection message (of type: DATA_EXCHANGE_LISTING_REQUEST_SYNC) to the remote deployment 503 with logic to update the appropriate slices of the share status DPO.

In some embodiments, no request from a consumer is necessary, and the data provider may create a share (not shown) and attach it to the data listing DXL2. The data provider may add a consumer to the share and the consumer may consume the data from the share. Note that in embodiments where no request is made by the consumer, the share can be created either by the data provider or a fulfiller (which is a data provider in the same remote deployment as the consumer).

FIG. 6 illustrates a cloud environment 600, which may be similar to the cloud environment 400 illustrated in FIG. 4. In the example of FIG. 6, a data provider on remote deployment 602 may wish to send a request for approval to publish their listing DXL3 to the exchange admin on remote deployment 601. The data provider and the exchange admin may use a special global message type (e.g., Global message type: DATA_EXCHANGE_LISTING_APPROVAL_REQUEST_SYNC) that is used for managing requests by a data provider for approval to publish their listings including creation, cancellation, rejection, and approval of publishing requests. A publishing request DPO on the local database of remote deployment 601 may be used by the exchange admin to manage approval/denial of listing publication requests. The publishing request DPO may include a plurality of slices, where each slice is a column of data corresponding to a single value for each of one or more members of a particular dimension of the DPO. The publishing request DPO may include an "exchange admin" slice for the exchange admin, a "data provider" slice for the data provider, and an "updatedOn" slice for tracking when a request was last updated. Each of the slices may include one or more data categories such as a local entity ID of the data exchange of the requested listing, a deployment that the data exchange of the requested listing is on, a deployment that the requested listing is on, a local entity ID of the requested listing, an account ID of the listing owner (provider), a status of the request (e.g. pending, rejected, approved, etc.), a JSON string containing information for user interface (UI) display, a reason for why the request was rejected (if it was rejected), a timestamp of when the request was issued, and a timestamp of when the request was last updated. The local database of remote deployment 602 may include a separate listing approval request DPO that is identical to the publishing request DPO and is used by the data provider to manage listing publication requests. The listing approval request DPO and the publishing request DPO may share similar information because multiple accounts cannot modify the same object/DPO, and thus two separate but similar DPOs (each owned by an individual actor—e.g., the exchange admin and the provider) are utilized.

The data provider may generate an approval request indicating a listing DXL3 that he/she wishes to publish on the remote deployment 601 of the exchange admin and update the (relevant data categories of) "provider" slice of the listing approval request DPO with the information of the request. Subsequently, the data provider (e.g., via remote deployment 602) may send a creation message to the exchange admin on remote deployment 601 to request publication of data listing DXL3 on the remote deployment 601. The creation message may write the approval request to the "exchange admin" slice and the "updatedOn" slice of the publishing request DPO on the remote deployment 601. More specifically, the creation message may update each of the relevant data categories listed above for each of the "exchange admin" and "updatedOn" slices of the publishing request DPO with the relevant information of the approval request. The creation message may also remove any rejected or approved approval requests for the same listing from the admin slice.

If the exchange admin decides to reject the approval request, it may update the "status of the request" and "reason for rejection" fields in the "exchange admin" and "updatedOn" slices of the publishing request DPO and use a rejection message to update the "data provider" slice of the listing approval request DPO on the remote deployment 602. As part of updating the data provider slice, the rejection message may update the "status of the request" and "reason for rejection" fields in the "data provider" slice of the listing approval request DPO accordingly.

If the exchange admin decides to grant the approval request, it may update the "status of the request" and "reason for rejection" fields in the "exchange admin" and "updatedOn" slices of the publishing request DPO and use a fulfillment message to update the data provider slice of the listing approval request DPO on the remote deployment 602. As part of updating the data provider slice, the fulfillment message may update the "status of the request" and "reason for rejection" fields in the "data provider" slice of the listing approval request DPO accordingly.

The data provider may also utilize a cancellation message, which may remove any approval requests (with status PENDING or APPROVED or REJECTED) from the exchange admin slice of the publishing request DPO on remote deployment 401. When the data provider publishes an approved listing, the cleanup "cancels" the request on their behalf using this same code path to remove the request on the exchange admin's side.

Figure 7:
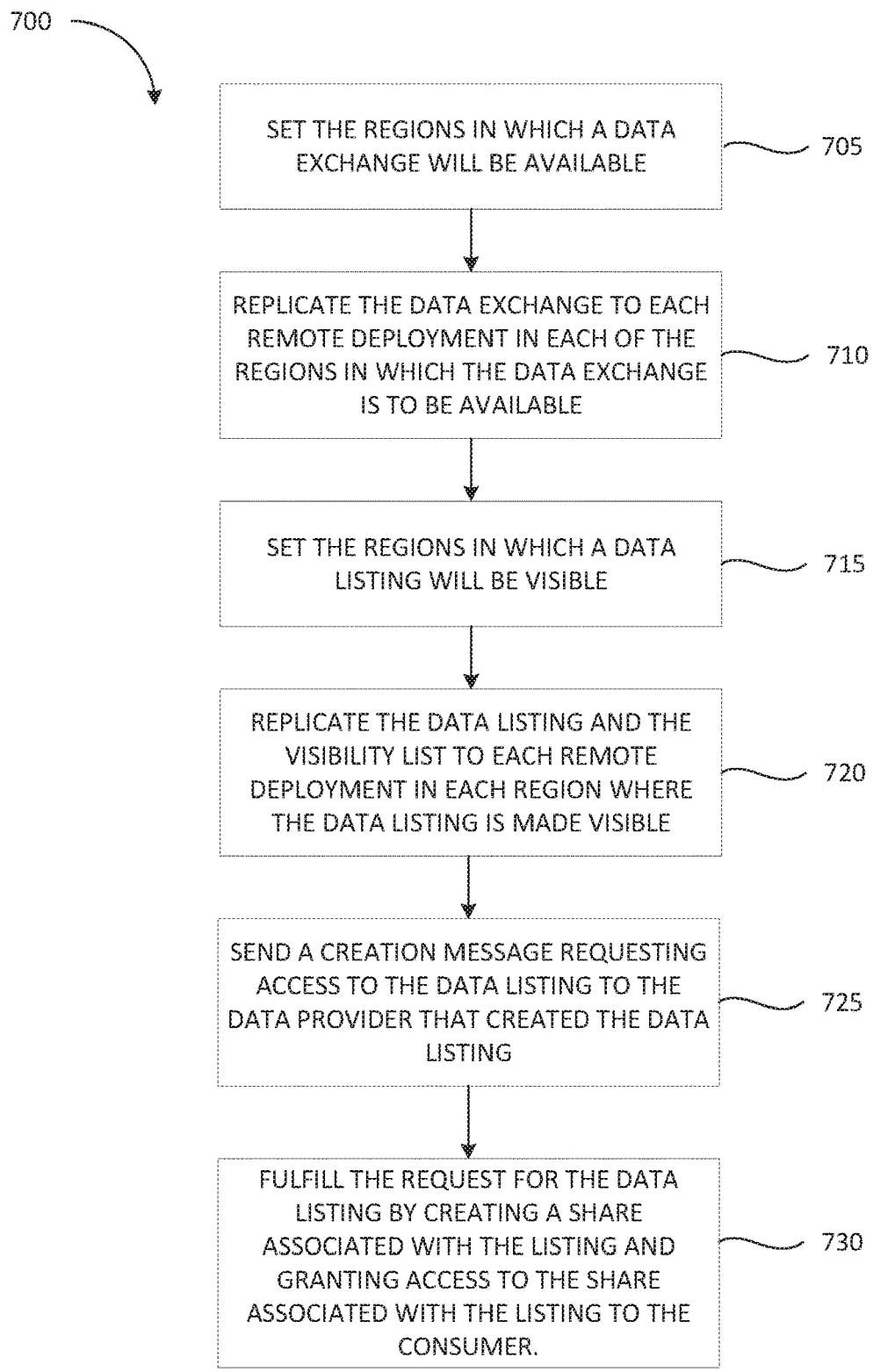
FIG. 7 is a flow diagram of a method for managing data exchange availability and data listing visibility, in accordance with some embodiments of the present invention.

FIG. 7 is a flow diagram of a method 700 for managing availability of a data exchange and visibility of data listings therein, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by respective processing devices of remote deployments 401 and 402 (illustrated in FIG. 4B).

Referring simultaneously to FIG. 4B, at block 705, the exchange admin may set the regions in which the data exchange DX1 will be available. The data exchange DX1 may provide functionality to allow an exchange admin on remote deployment 401 to specify the regions in which the data exchange DX1 will be available (resolvable) and from which regions customers can be added as members of the data exchange DX1. The remote deployment 401 may provide commands (e.g., SQL commands) for the exchange admin to set available regions. When an exchange admin sets the available regions for the data exchange, this information may be persisted as a list in the local database (not shown) of remote deployment 401. The local database may be any appropriate database, such as e.g., FoundationDB. The local database of remote deployment 401 may include a number of data processing objects (DPOs) in which data pertaining to the data exchange DX1 may be stored. For example, a base dictionary DPO may comprise a set of database tables used to store information about the database's definition including information about database objects such as tables, indexes, columns, datatypes, and views.

One such DPO may be an available regions DPO which extends the base dictionary DPO and in which the available regions of the data exchange DX1 may be persisted. As can be seen in the example commands listed above, the exchange admin may specify the regions in which the data exchange DX1 is available on a region by region basis, instead of specifying particular remote deployments in which DX1 is available on a deployment by deployment basis. The remote deployment 401 may persist the deployment location ID of each region where the data exchange is to be made available. A deployment location ID may be represented in any suitable alpha-numeric form such as 1001 or region1 (corresponding to region 1), 1002 or region2 (corresponding to region 2). The list of available deployment location IDs can be stored as a string (defined as e.g., static final String AVAILABLE_DEPLOYMENT_LOCATION_IDS="availabledeploymentlocationIDs") within the available regions DPO, and the string may be parsed to determine the deployment location IDs of regions where the data exchange DX1 is available when a member of the data exchange DX1 wishes to know the available regions.

At block 710, the remote deployment 401 may then replicate the data exchange DX1 to each remote deployment in each of the regions in which the data exchange is to be available (as specified by the exchange admin) using the database replication method discussed hereinabove. For the global object corresponding to the data exchange DX1, remote deployment 401 may decide which remote deployment(s) the global object is to be replicated to by parsing the string of deployment location IDs from the available regions DPO to determine the list of regions where the data exchange DX1 is available.

Upon the available regions for the data exchange being set, at block 715, a data provider of the data exchange DX1 may set the regions in which their listings (e.g., listing DXL1) will be visible (e.g., set listing visibility). A listing may be a customer viewable representation of data that the data provider wishes to share. The listing may describe what the underlying data is about, contain usage examples regarding the data, and other metadata. The data provider creates the listing, and upon creation, only the data provider can see the listing. Data providers may send listings to the exchange admin for publishing approval (referred to as "listing approval" as described in further detail herein). Once approved, data providers can publish listings to be available globally, in regions where the data exchange DX1 is available.

When the data provider sets the regions in which the listing DXL1 is to be visible, this information may be persisted as a list in the local database of the remote deployment 402 (not shown). The local database of remote deployment 402 may be any suitable database such as e.g., FoundationDB and may include a listing visibility regions DPO (not shown) which extends the base dictionary DPO and in which the regions where one or more listings are visible may be persisted. As can be seen in the example commands listed above, the data provider may specify the regions in which their listings are visible on a region by region basis, instead of specifying particular deployments on which their listings are visible on a deployment by deployment basis. The list of deployment location IDs where the listing DXL1 is to be made visible can be stored as a string in the listing visibility regions DPO, and the string may be parsed to determine the deployment location IDs of regions in which the listing DXL1 is visible when the data provider or the exchange admin wishes to know the regions in which the listing DXL1 is to be visible.

When the visible regions for the listing DXL1 are set, at block 720, the remote deployment 402 may replicate the listing DXL1 and the visibility list to each remote deployment in each region where the listing DXL1 is made visible. As discussed above, the remote deployment 402 may obtain the list of regions where the listing is visible by parsing the string of deployment location IDs from the listing visibility regions DPO and may package the list of regions along with other information regarding the listing such as a type of the listing as well as metadata of the listing into a single listing information package. The remote deployment 402 may utilize the replication method described hereinabove, and when the global object corresponding to the listing DXL1 is created, it may include the listing information package.

Referring now to FIG. 5 as well, when the consumer in remote deployment 503 wishes to request the listing DXL2, they may utilize the listing metadata (included within the listing information package that is replicated with the global object corresponding to listing DXL2) that indicates who the data provider is and where they are from/their origin remote deployment to determine where to send a request to. The remote deployment 503 may utilize a global message having Global message type: DATA_EXCHANGE_LISTING_REQUEST_SYNC: This type of message may be used for managing consumers' requests to providers for listings. This includes creating, cancelling, rejecting, and fulfilling these requests, as well as cleaning requests up (expiring them) when members are removed from the data exchange or a listing is deleted. At block 725, the remote deployment 503 may send a creation message requesting access to the listing DXL2 to the remote deployment 502, which may include a local database having an access request DPO that may be used by the data provider to manage approval/denial of requests for data listings.

At block 730, the data provider in remote deployment 502 may fulfill the request for the listing DXL2 by creating a share associated with the listing and granting access to the share associated with the listing to the consumer. It should be noted that the share associated with that listing DXL2 can be created (and access to it granted by) either by the data provider or a fulfiller which is a data provider in the same remote deployment as the consumer (e.g., remote deployment 403).

Figure 8:
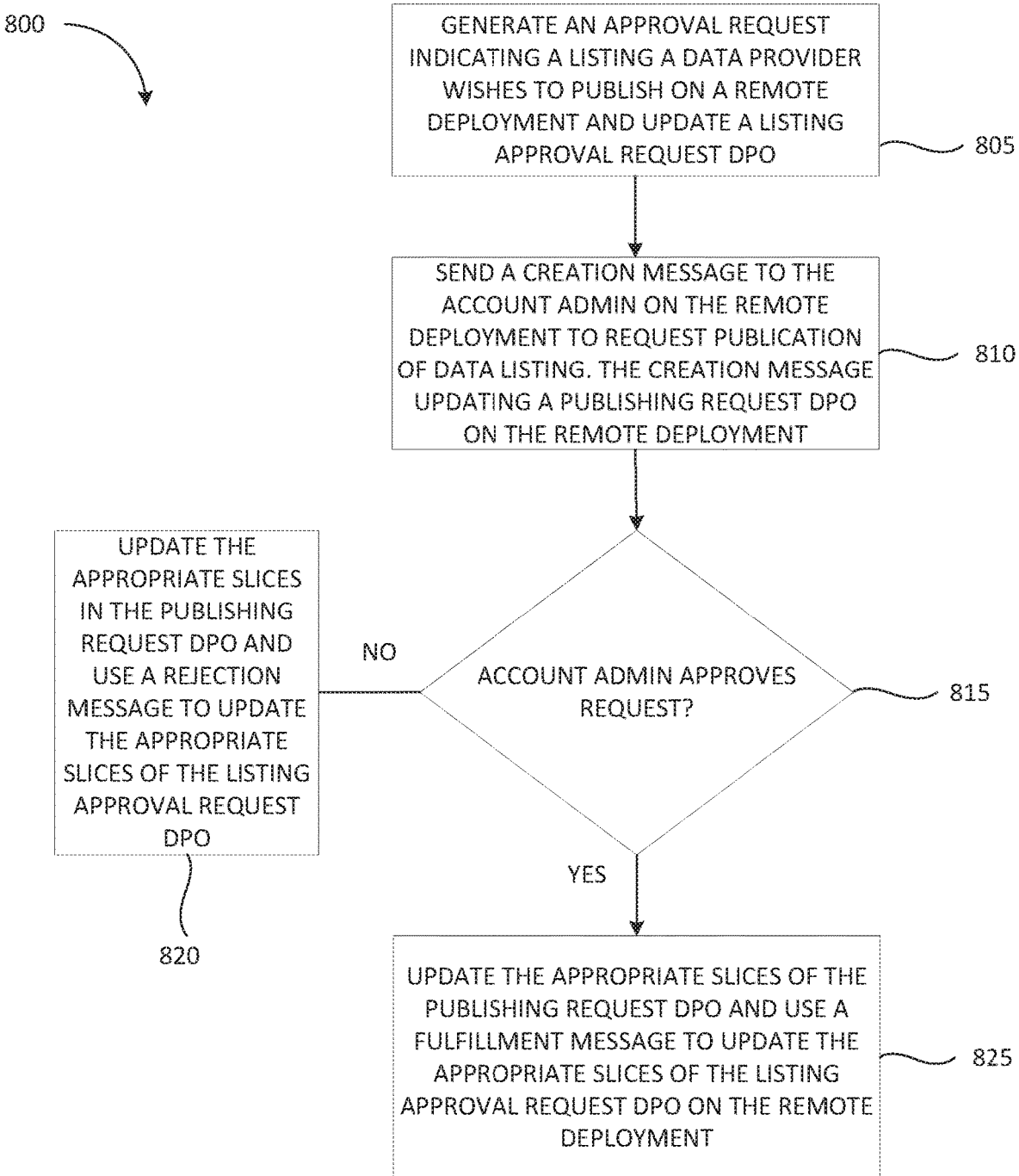
FIG. 8 is a flow diagram of a method for managing listing approval requests, in accordance with some embodiments of the present invention.

FIG. 8 is a flow diagram of a method 800 for managing listing approval requests, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by respective processing devices of remote deployments 401 and 402 (illustrated in FIG. 4B).

Referring also to FIG. 6, a data provider on remote deployment 602 may wish to send a request for approval to publish their listing DXL3 to the exchange admin on remote deployment 601. The data provider and the exchange admin may use a special global message type (e.g., Global message type: DATA_EXCHANGE_LISTING_APPROVAL_REQUEST_SYNC) that is used for managing requests by a data provider for approval to publish their listings including creation, cancellation, rejection, and approval of publishing requests. A publishing request DPO on the local database of remote deployment 601 may be used by the exchange admin to manage approval/denial of listing publication requests. The publishing request DPO may include a plurality of slices, where each slice is a column of data corresponding to a single value for each of one or more members of a particular dimension of a DPO. The publishing request DPO may include an "exchange admin" slice for the exchange admin, a "data provider" slice for the data provider, and an "updatedOn" slice for tracking when a request was last updated. Each of the slices may include one or more data categories such as a local entity ID of the data exchange of the requested listing, a deployment that the data exchange of the requested listing is on, a deployment that the requested listing is on, a local entity ID of the requested listing, an account ID of the listing owner (provider), a status of the request (e.g. pending, rejected, approved, etc.), a JSON string containing information for user interface (UI) display, a reason for why the request was rejected (if it was rejected), a timestamp of when the request was issued, and a timestamp of when the request was last updated. The local database of remote deployment 602 may include a separate listing approval request DPO that is identical to the publishing request DPO and is used by the data provider to manage listing publication requests.

At block 805, a data provider on remote deployment 602 may generate an approval request indicating a listing DXL3 that he/she wishes to publish on the remote deployment 601 of the exchange admin and update the (relevant data categories of the) "provider" slice of the listing approval request DPO with the information of the request. Subsequently, at block 810, the data provider (e.g., via remote deployment 602) may send a creation message to the exchange admin on remote deployment 601 to request publication of data listing DXL3 on the remote deployment 601. The creation message may write the approval request to the "exchange admin" and "updatedOn" slices of the publishing request DPO on the remote deployment 601. More specifically, the creation message may update each of the relevant data categories listed above for each of the "exchange admin" and "updatedOn" slices of the publishing request DPO with the relevant information of the approval request. The creation message may also remove any rejected or approved approval requests for the same listing from the "admin" slice.

At block 815, if the exchange admin decides to reject the approval request, it may update the "status of the request" and "reason for rejection" fields in the "exchange admin" and "updatedOn" slices of the publishing request DPO and use a rejection message to update the data provider slice of the listing approval request DPO on the remote deployment 602 at block 820. As part of updating the "data provider" slice, the rejection message may update the "status of the request" and "reason for rejection" fields in the "data provider" slice of the listing approval request DPO accordingly.

If at block 815, the exchange admin decides to grant the approval request, it may update the "status of the request" and "reason for rejection" fields in the "exchange admin" and "updatedOn" slices of the publishing request DPO and use a fulfillment message to update the data provider slice of the listing approval request DPO on the remote deployment 602 at block 825. As part of updating the data provider slice, the fulfillment message may update the "status of the request" and "reason for rejection" fields in the "data provider" slice of the listing approval request DPO accordingly.

The data provider may also utilize a cancellation message, which may remove any approval requests (with status PENDING or APPROVED or REJECTED) from the exchange admin slice of the publishing request DPO on remote deployment 401. When the data provider publishes an approved listing, the cleanup "cancels" the request on their behalf using this same code path to remove the request on the exchange admin's side.

Figure 9:
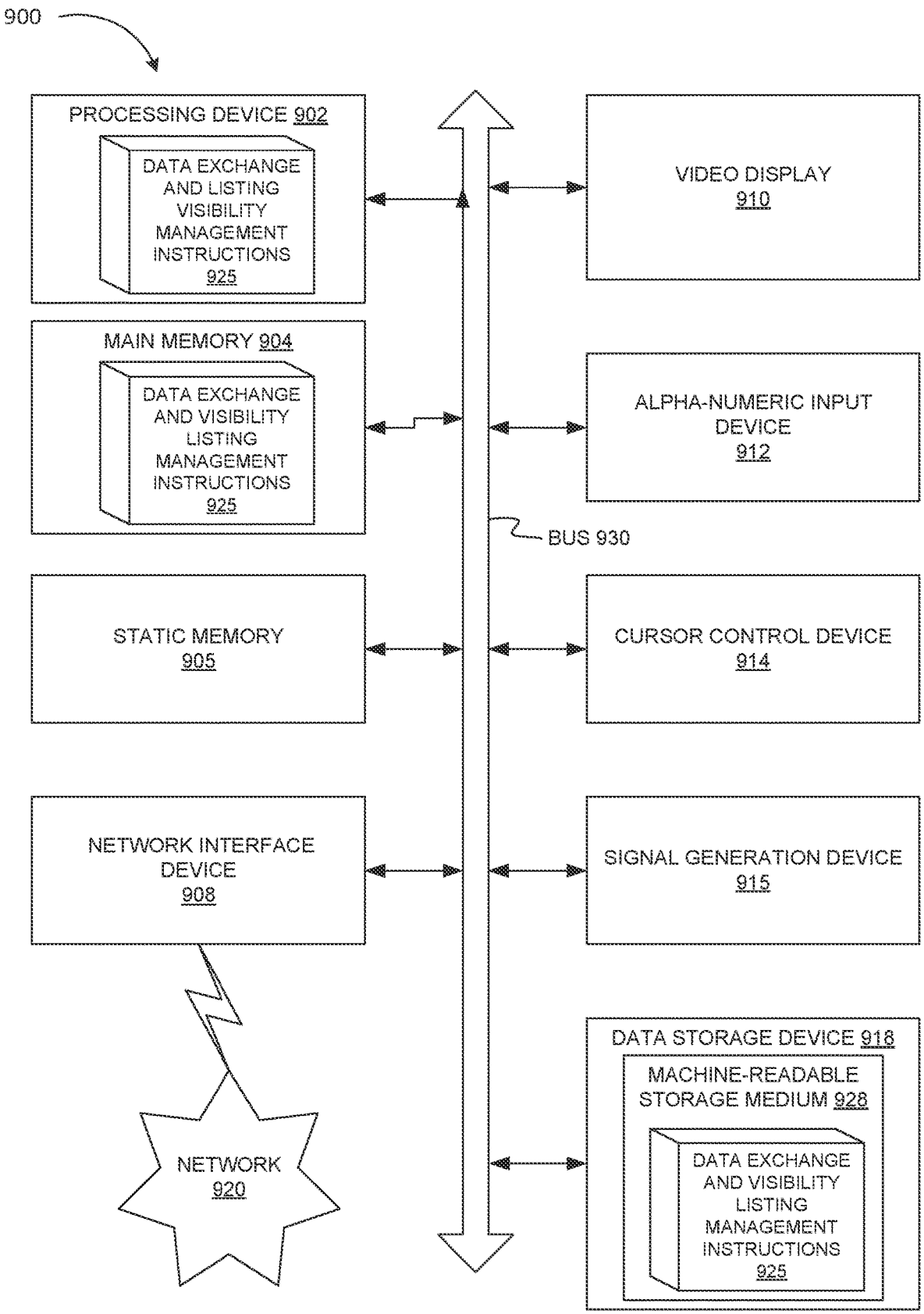
FIG. 9 is a block diagram of an example computing device that may perform one or more of the operations described herein, in accordance with some embodiments of the present invention.

FIG. 9 illustrates a diagrammatic representation of a machine in the example form of a computer system 900 within which a set of instructions, for causing the machine to perform any one or more of the methodologies discussed herein for replicating a share object to a remote deployment. More specifically, the machine may modify a share object of a first account into a global object wherein the share object includes grant metadata indicating share grants to a set of objects of a database. The machine may create, in a second account located in a remote deployment, a local replica of the share object on the remote deployment based on the global object and replicate the set of objects of the database to a local database replica on the remote deployment; and refresh the share grants to the local replica of the share object.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of a server.

The exemplary computer system 900 includes a processing device 902, a main memory 904 (e.g., read-only memory (ROM), flash memory, dynamic random access memory (DRAM), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute data exchange and listing visibility management instructions 925, for performing the operations and steps discussed herein.

The data storage device 918 may include a machine-readable storage medium 928, on which is stored one or more sets of data exchange and listing visibility management instructions 925 (e.g., software) embodying any one or more of the methodologies of functions described herein. The data exchange and listing visibility management instructions 925 may also reside, completely or at least partially, within the main memory 904 or within the processing device 902 during execution thereof by the computer system 900; the main memory 904 and the processing device 902 also constituting machine-readable storage media. The data exchange and listing visibility management instructions 925 may further be transmitted or received over a network 920 via the network interface device 908.

The machine-readable storage medium 928 may also be used to store instructions to perform a method for determining functions to compile, as described herein. While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    specifying a set of geographical regions where a data exchange is available by specifying, within a first data persistence object (DPO), a string comprising a location identifier of each of the set of geographical regions, each of the set of geographical regions comprising one or more remote deployments and wherein the first DPO extends a base DPO of the data exchange that stores metadata defining the data exchange, wherein each of the one or more remote deployments corresponds to a deployment shard, wherein each deployment shard in a geographical region has a similar location identifier of the geographical region, wherein information related to the data exchange in the geographical region is accessible within the deployment shard, wherein the information related to the data exchange in the geographical region is duplicated to a new deployment shard in response to creation of the new deployment shard in the geographical region;
    specifying one or more of the set of geographical regions where a data listing is visible;
    in response to receiving a request to access the data listing from a remote deployment of the one or more geographical regions, determining whether to reject or fulfill the request, wherein the request to access the data listing from the remote deployment comprises a global message for managing requests to data providers for access to data listings, and wherein the global message updates the base DPO of the data exchange with information of the request, wherein the global message includes custom logic that is utilized to perform the update of the base DPO with the information of the request; and
    in response to determining to fulfill the request, replicating, by a processing device, data of the data listing to the remote deployment.

2. The method of claim 1, further comprising:
    parsing the string to determine the set of geographical regions wherein the data exchange is available;
    obtaining each remote deployment from each of the set of geographical regions wherein the data exchange is to be available; and
    replicating the data exchange to each remote deployment from each of the set of geographical regions wherein the data exchange is to be available.

3. The method of claim 2, wherein replicating the data exchange to a remote deployment comprises:
    generating a global representation of the data exchange;
    replicating metadata of the data exchange to the remote deployment; and
    creating a local replica of the data exchange on the remote deployment based on the global representation.

4. The method of claim 1, wherein specifying the one or more of the set of geographical regions where a data listing is visible comprises:
    modifying the base DPO of the data exchange with a second string comprising a location identifier of each of the one or more geographical regions where the data listing is visible.

5. The method of claim 4, further comprising:
    parsing the second string to determine the one or more geographical regions wherein the data listing is to be visible;

obtaining each remote deployment from each of the one or more geographical regions wherein the data listing is to be visible; and replicating the data listing to each remote deployment from each of the one or more geographical regions wherein the data listing is to be visible.

6. The method of claim 4, further comprising:

modifying the one or more of the set of geographical regions where the data listing is visible by adding one or more new location identifiers to the string or removing one or more of the location identifiers from the string.

7. The method of claim 1, further comprising receiving a request for exchange administrator approval to publish the data listing.

8. The method of claim 7, wherein the request for exchange administrator approval to publish the data listing comprises a global message for managing requests by data providers for approval to publish data listings, and wherein the global message updates a DPO of a remote deployment the exchange admin is hosted on with information of the request.

9. A system comprising:

a memory; and a processing device operatively coupled to the memory, the processing device to:

specify a set of geographical regions where a data exchange is available by specifying, within a first data persistence object (DPO), a string comprising a location identifier of each of the set of geographical regions, each of the set of geographical regions comprising one or more remote deployments and wherein the first DPO extends a base DPO of the data exchange that stores metadata defining the data exchange, wherein each of the one or more remote deployments corresponds to a deployment shard, wherein each deployment shard in a geographical region has a similar location identifier of the geographical region, wherein information related to the data exchange in the geographical region is accessible within the deployment shard, wherein the information related to the data exchange in the geographical region is duplicated to a new deployment shard in response to creation of the new deployment shard in the geographical region;

specify one or more of the set of geographical regions where a data listing is visible;

in response to receiving a request to access the data listing from a remote deployment of the one or more geographical regions, determine whether to reject or fulfill the request, wherein the request to access the data listing from the remote deployment comprises a global message for managing requests to data providers for access to data listings, and wherein the global message updates the base DPO of the data exchange with information of the request, wherein the global message includes custom logic that is utilized to perform the update of the base DPO with the information of the request; and in response to determining to fulfill the request, replicate data of the data listing to the remote deployment.

10. The system of claim 9, wherein the processing device is further to:

parse the string to determine the set of geographical regions wherein the data exchange is available;

obtain each remote deployment from each of the set of geographical regions wherein the data exchange is to be available; and replicate the data exchange to each remote deployment from each of the set of geographical regions wherein the data exchange is to be available.

11. The system of claim 10, wherein to replicate the data exchange, the processing device is to:

generate a global representation of the data exchange;

replicate metadata of the data exchange to the remote deployment; and create a local replica of the data exchange on the remote deployment based on the global representation.

12. The system of claim 9, wherein to specify the one or more of the set of geographical regions where a data listing is visible, the processing device is to:

modify the base DPO of the data exchange with a second string comprising a location identifier of each of the one or more geographical regions where the data listing is visible.

13. The system of claim 12, wherein the processing device is further to:

parse the second string to determine the one or more geographical regions wherein the data listing is to be visible;

obtain each remote deployment from each of the one or more geographical regions wherein the data listing is to be visible; and replicate the data listing to each remote deployment from each of the one or more geographical regions wherein the data listing is to be visible.

14. The system of claim 12, wherein the processing device is further to:

modify the one or more of the set of geographical regions where the data listing is visible by adding one or more new location identifiers to the string or removing one or more of the location identifiers from the string.

15. The system of claim 9, wherein the processing device is further to:

receive a request for exchange administrator approval to publish the data listing.

16. The system of claim 15, wherein the request for exchange administrator approval to publish the data listing comprises a global message for managing requests by data providers for approval to publish data listings, and wherein the global message updates a DPO of a remote deployment the exchange admin is hosted on with information of the request.

17. A non-transitory computer-readable medium having instructions stored thereon which, when executed by a processing device, cause the processing device to:

specify a set of geographical regions where a data exchange is available by specifying, within a first data persistence object (DPO), a string comprising a location identifier of each of the set of geographical regions, each of the set of geographical regions comprising one or more remote deployments and wherein the first DPO extends a base DPO of the data exchange that stores metadata defining the data exchange, wherein each of the one or more remote deployments corresponds to a deployment shard, wherein each deployment shard in a geographical region has a similar location identifier of the geographical region, wherein information related to the data exchange in the geographical region is accessible within the deployment shard, wherein the information related to the data exchange in the geographical region is duplicated to a new deployment shard in response to creation of the new deployment shard in the geographical region;

specify one or more of the set of geographical regions where a data listing is visible;

in response to receiving a request to access the data listing from a remote deployment of the one or more geographical regions, determine whether to reject or fulfill the request, wherein the request to access the data listing from the remote deployment comprises a global message for managing requests to data providers for access to data listings, and wherein the global message updates the base DPO of the data exchange with information of the request, wherein the global message includes custom logic that is utilized to perform the update of the base DPO with the information of the request; and in response to determining to fulfill the request, replicate, by the processing device, data of the data listing to the remote deployment.

18. The non-transitory computer-readable medium of claim 17, wherein the processing device is further to:

parse the string to determine the set of geographical regions wherein the data exchange is available;

obtain each remote deployment from each of the set of geographical regions wherein the data exchange is to be available; and replicate the data exchange to each remote deployment from each of the set of geographical regions wherein the data exchange is to be available.

19. The non-transitory computer-readable medium of claim 18, wherein to replicate the data exchange, the processing device is to:

generate a global representation of the data exchange;

replicate metadata of the data exchange to the remote deployment; and create a local replica of the data exchange on the remote deployment based on the global representation.

20. The non-transitory computer-readable medium of claim 17, wherein to specify the one or more of the set of geographical regions where a data listing is visible, the processing device is to:

modify the base DPO of the data exchange with a second string comprising a location identifier of each of the one or more geographical regions where the data listing is visible.

21. The non-transitory computer-readable medium of claim 20, wherein the processing device is further to:

parse second the string to determine the one or more geographical regions wherein the data listing is to be visible;

obtain each remote deployment from each of the one or more geographical regions wherein the data listing is to be visible; and replicate the data listing to each remote deployment from each of the one or more geographical regions wherein the data listing is to be visible.

22. The non-transitory computer-readable medium of claim 20, wherein the processing device is further to:

modify the one or more of the set of geographical regions where the data listing is visible by adding one or more new location identifiers to the string or removing one or more of the location identifiers from the string.

23. The non-transitory computer-readable medium of claim 17, wherein the processing device is further to:

receive a request for exchange administrator approval to publish the data listing.

24. The non-transitory computer-readable medium of claim 23, wherein the request for exchange admin approval to publish the data listing comprises a global message for managing requests by data providers for approval to publish data listings, and wherein the global message updates a DPO of a remote deployment the exchange administrator is hosted on with information of the request.

* * * * *